United States Patent
Dong et al.

(10) Patent No.: US 7,523,611 B2
(45) Date of Patent: Apr. 28, 2009

(54) HYDROSTATIC TRANSMISSION WITH EXTERNAL MANIFOLD

(75) Inventors: Xingen Dong, Greeneville, TN (US); Barun Acharya, Johnson City, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 243 days.

(21) Appl. No.: 11/467,375

(22) Filed: Aug. 25, 2006

(65) Prior Publication Data

US 2007/0193264 A1    Aug. 23, 2007

Related U.S. Application Data

(60) Provisional application No. 60/711,244, filed on Aug. 25, 2005.

(51) Int. Cl.
*F16D 31/02* (2006.01)
(52) U.S. Cl. .......................... 60/487; 60/456
(58) Field of Classification Search .................. 60/456, 60/487, 488, 490; 92/12.2
See application file for complete search history.

(56) References Cited

U.S. PATENT DOCUMENTS

| | | | |
|---|---|---|---|
| 2,495,685 A | 1/1950 | Beaman et al. | |
| 3,177,665 A * | 4/1965 | Power | 60/456 |
| 4,105,369 A | 8/1978 | McClocklin | |
| 5,363,740 A | 11/1994 | Coakley | |
| 5,473,964 A | 12/1995 | Okada et al. | |
| 5,540,563 A | 7/1996 | Hansell | |
| 5,622,051 A * | 4/1997 | Iida et al. | 60/456 |
| 6,176,086 B1 | 1/2001 | Betz | |
| 6,427,442 B2 | 8/2002 | Thoma et al. | |
| 6,550,243 B2 | 4/2003 | Hauser et al. | |
| 6,675,696 B1 * | 1/2004 | Langenfeld | 60/487 |
| 2003/0070429 A1 | 4/2003 | Jolliff et al. | |

* cited by examiner

*Primary Examiner*—Michael Leslie
(74) *Attorney, Agent, or Firm*—Renner, Otto, Boisselle & Sklar, LLP

(57) ABSTRACT

A hydrostatic transmission including a hydraulic pump, a hydraulic motor, and an external manifold surrounded by and in contact with air for connecting the hydraulic pump and a hydraulic motor. The external manifold facilitates heat transfer from hydraulic fluid flowing therein to the surrounding air. The design of the hydrostatic transmission with external manifold also allows virtually any desired relative orientation of the pump and motor to be achieved by only changing the shape of the manifold.

22 Claims, 22 Drawing Sheets

SECTION B-B

SECTION A-A

SECTION C-C

HYDROSTATIC TRANSMISSION WITH EXTERNAL MANIFOLD

RELATED APPLICATIONS

This application hereby incorporates by reference and claims the benefit of U.S. Provisional Application No. 60/711,244 filed Aug. 25, 2005.

FIELD OF THE INVENTION

The present invention relates generally to hydrostatic transmissions. More particularly, the invention relates to hydrostatic transmissions for use in vehicles, such as mowing machines.

BACKGROUND OF THE INVENTION

Hydrostatic transmissions have many uses, including the propelling of vehicles, such as mowing machines, and offer a stepless control of the machine's speed. A typical hydrostatic transmission system includes a variable displacement main hydraulic pump connected in a closed hydraulic circuit with a fixed displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral. For most applications, the pump is driven by a prime mover, such as an internal combustion engine or an electrical motor, at a certain speed in a certain direction. Changing the displacement of the pump will change its output flow rate, which controls the speed of the motor. Pump outflow can be reversed, thus reversing the direction of the motor. In a vehicle, the motor is typically connected through suitable gearing to the vehicle's wheels or tracks.

Fluid connections between the pump, motor and conduits should generally be leak free. However, as is often the case, the hoses or other conduits connecting the pump and motor can leak causing a loss of hydraulic fluid and a decrease in transmission performance. In response to the leakage problem, prior art hydrostatic transmissions were created which generally prevent leakage of fluid from the pump and motor by containing the leakage and returning it to the closed hydraulic circuit as needed.

Hydrostatic transmissions generate heat as the hydraulic fluid is circulated between the pump and the motor. Friction between moving parts of the pump and/or motor also generates heat. As hydrostatic transmissions become more compact, heat related issues become more of a problem due to the decreased surface area of the hydrostatic transmission available for dissipating heat.

SUMMARY OF THE INVENTION

The present invention provides a hydrostatic transmission including a hydraulic pump, a hydraulic motor, and an external manifold surrounded by and in contact with air for connecting the hydraulic pump and a hydraulic motor. The external manifold facilitates heat transfer from hydraulic fluid flowing therein to the surrounding air. The design of the hydrostatic transmission with external manifold also allows virtually any desired relative orientation of the pump and motor to be achieved by only changing the shape of the manifold.

Accordingly, the invention provides a hydrostatic transmission comprising a hydraulic pump including a pump assembly and a pump housing, a hydraulic motor including a motor assembly and a motor housing spaced away from the pump housing, and a structure for providing fluid communication between the hydraulic pump and the hydraulic motor. The structure includes at least a base portion of the pump housing, at least a base portion of the motor housing, and an interconnecting portion for connecting the pump housing portion and the motor housing portion. The interconnecting portion has at least one flow passage for connecting the pump and motor, and the interconnecting portion being surrounded by and in contact with air for cooling of fluid passing through the at least one flow passage in the interconnecting portion. The pump assembly and/or motor assembly can be removably attached to at least the base portion of the pump housing or motor housing, respectively. The base portions can include pump or motor end caps.

In an exemplary embodiment, the interconnecting portion has a width in a direction transverse to the longitudinal direction of the flow passageway therein that is narrower than the corresponding width of at least one of the pump or motor housings. The structure for providing fluid communication between the hydraulic pump and the hydraulic motor can have a generally planar extent that is parallel to a longitudinal axis of one of the pump or motor and perpendicular to the longitudinal axis of the other. One or more cooling fins can be provided on the interconnecting portion.

According to another aspect of the invention, a hydrostatic transmission comprises a pump including a pump assembly and a pump housing, a motor including a motor assembly and a motor housing, and an external manifold extending between and connecting the pump housing to the motor housing. The external manifold includes at least one flow passage for connecting the pump and motor, the external manifold being surrounded by and in contact with air for cooling of fluid passing through the external manifold.

In an exemplary embodiment, the external manifold has a width in a direction transverse to the longitudinal direction of the flow passage therein that is narrower than the corresponding width of at least one of the pump housing or motor housing. The external manifold can form at least a base portion of the pump housing and/or at least a base portion of the motor housing. The pump assembly and motor assembly can be removably attached to respective base portions of the manifold. The base portions can include pump or motor end caps. The external manifold can have a generally planar extent that is parallel to a longitudinal axis of one of the pump or motor and perpendicular to the longitudinal axis of the other.

Further features of the invention will become apparent from the following detailed description when considered in conjunction with the drawings.

DETAILED DESCRIPTION

Figure 1:
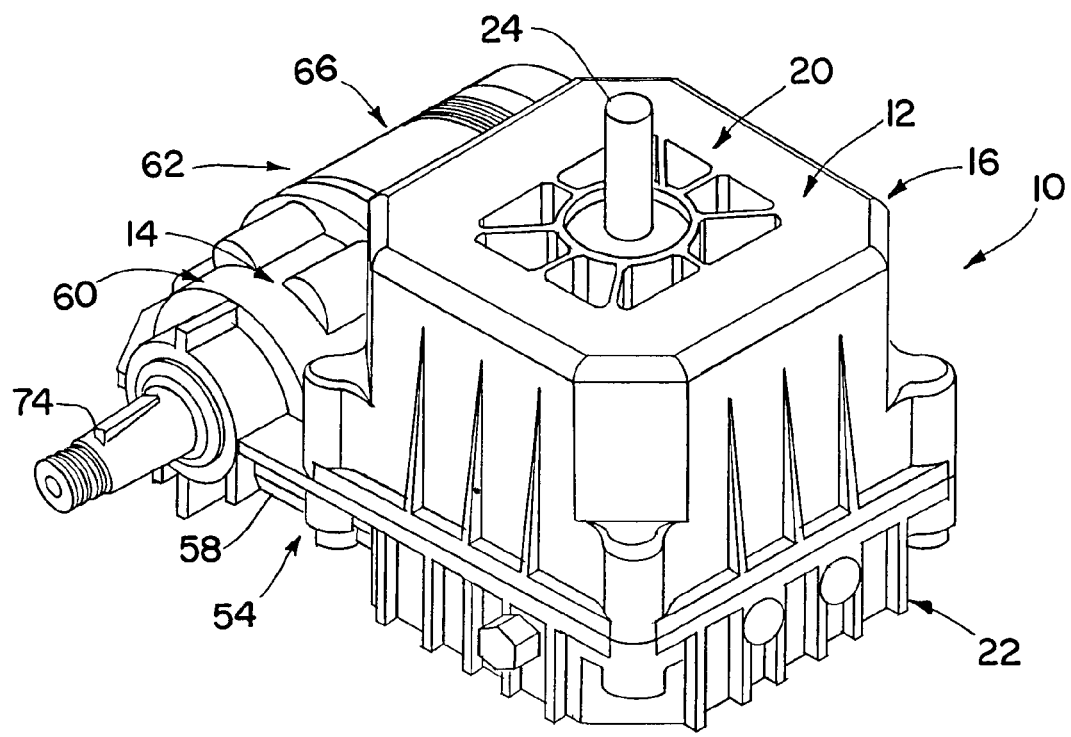
FIG. 1 is a perspective view of a hydrostatic transmission in accordance with the invention.

Referring now to the drawings in detail, and initially to FIGS. 1-7B, a hydrostatic transmission 10 in accordance with the present invention is illustrated. The hydrostatic transmission 10 includes a reversible hydraulic pump 12 connected to a hydraulic motor 14 in a closed loop hydraulic circuit.

With reference to FIGS. 1, 2, and 3A-3C, the hydraulic pump 12 includes a hydraulic pump assembly 15 and a pump housing 16. The pump housing 16 includes an upper housing portion 20 and a lower housing portion 22 (base portion) which, as will be described, is part of an integral monolithic structure including the external manifold or bridge portion that connects the pump 12 and motor 14. Although in the illustrated exemplary embodiments, the hydraulic pump 12 is a variable flow reversible piston pump, the type of pump is not germaine to the invention and, therefore, any suitable type of pump can be used in accordance with the invention.

As shown in FIGS. 3A-3C, the hydraulic pump 12 includes an input shaft 24 that extends through an opening in an upper wall of the upper housing portion 20 (FIG. 1) and is supported for rotation relative to the upper housing portion 20 by bearing 26. A seal 28 is located adjacent the bearing 26 for sealing the input shaft 24 to prevent fluid from escaping from the interior of the hydrostatic transmission 10. The hydraulic pump 12 further includes a cylinder barrel 32 having a plurality of pistons 34 mounted for reciprocal movement therein. The cylindrical barrel 32 is coupled to the input shaft 24 for rotation therewith. The input shaft 24 is connected to a device, such as a pulley (not shown), that when acted upon by a source of motive power rotates the input shaft 24.

Figure 2:
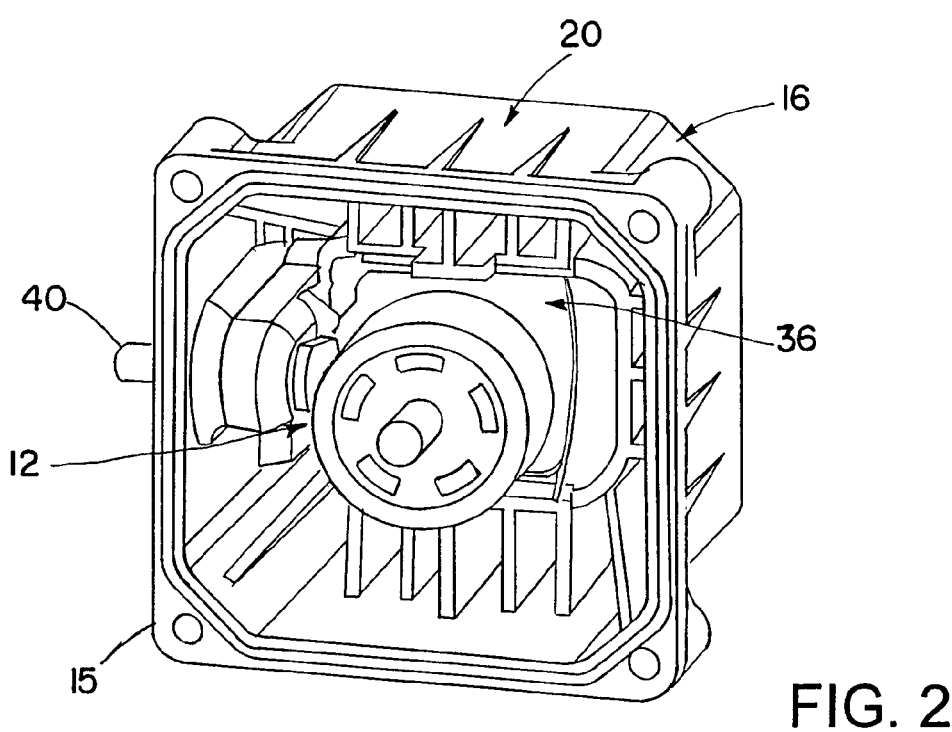
FIG. 2, is a perspective view of a hydraulic pump assembly and pump housing portion.
Figure 3:
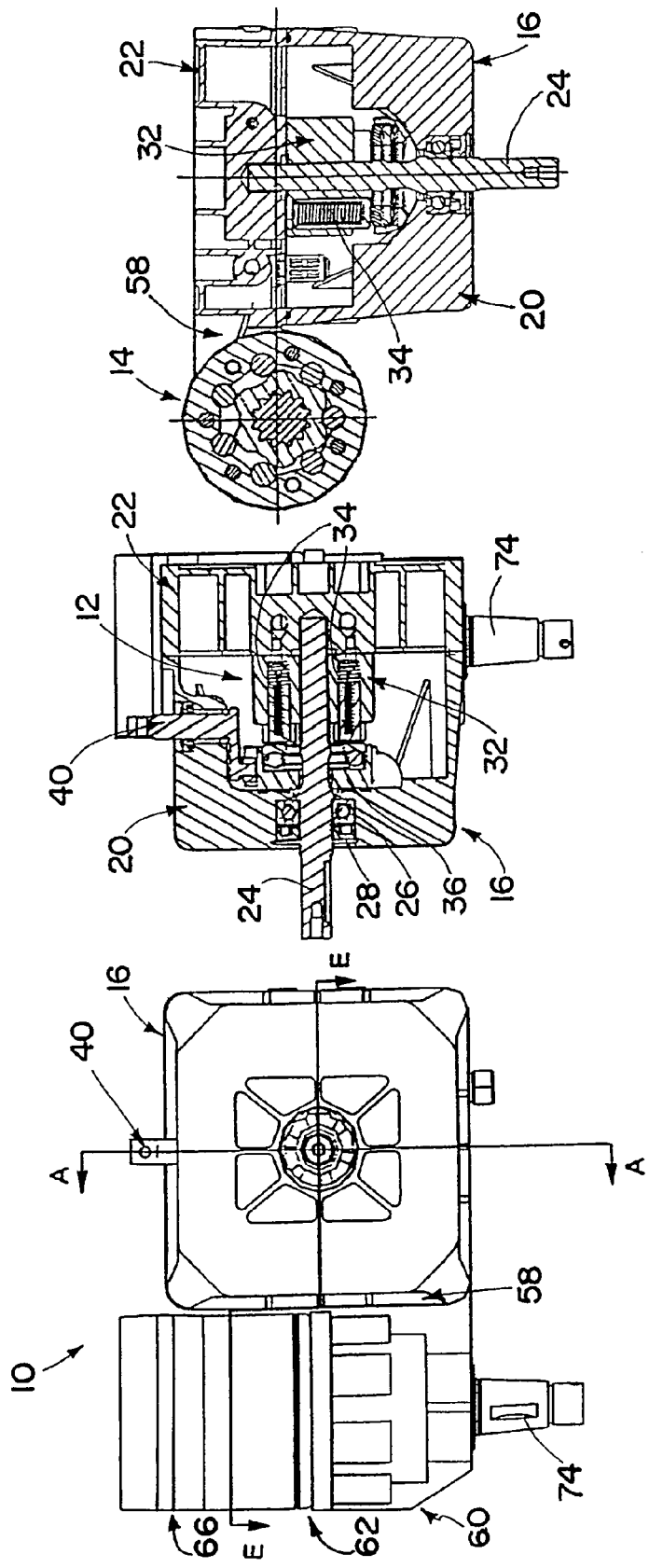
FIG. 3A, is a top view of the hydrostatic transmission of FIG. 1.
FIG. 3B is a cross-sectional view of the hydrostatic transmission taken along the line A-A of FIG. 3A.
FIG. 3C is a cross-sectional view of the hydrostatic transmission taken along the line E-E of FIG. 3A.

The input shaft 24 extends through a swash block 36 of the hydraulic pump 12. The swash block 36 serves as a control member for controlling the fluid flow out of the hydraulic pump. The swash block 36 is arranged so that the pistons 34 of the cylinder barrel 32 abut a surface of the swash block. The swash block 36 is connected by a linkage to an actuating member, such as a trunnion arm 40, which protrudes through a hole in a side wall of the upper housing portion 20, as shown in FIG. 2. As will be appreciated, the swash block 36 can be inclined in both directions from its neutral point, or zero-inclination (the horizontal plane in FIG. 3C). Rotation of the trunnion arm 40 in one direction inclines the swash block 36 such that the pump 12 pumps fluid in a first direction, while rotation of the trunnion arm 40 in the opposite direction inclines the swash block 36 such that the pump 12 pumps fluid in the opposite direction. As will be further appreciated, suitable control means can be connected to the trunnion arm 40 for allowing an operator of a vehicle to rotate the trunnion arm 40 as desired.

Figure 4:
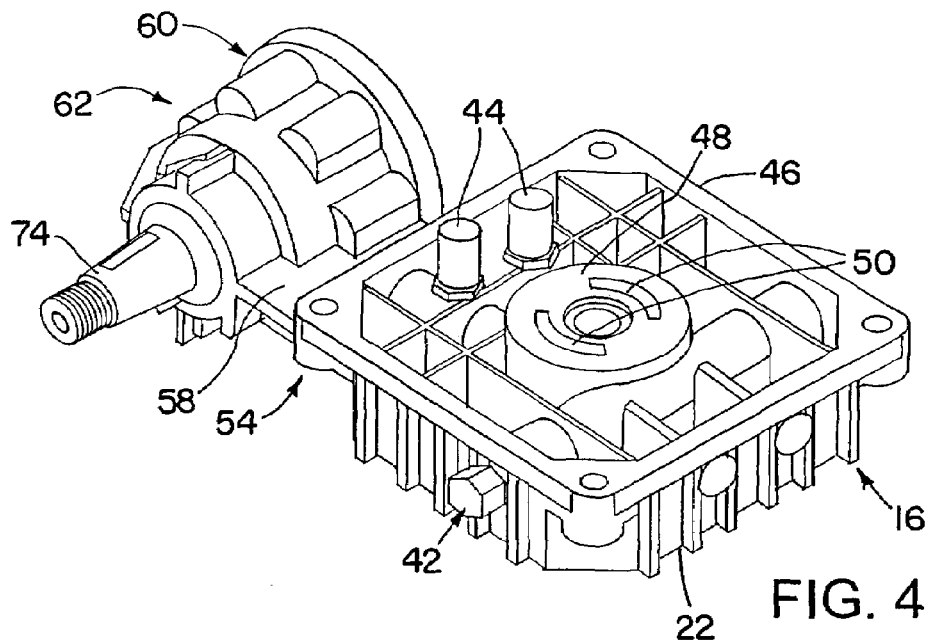
FIG. 4 is a perspective view of a structure including an interconnecting portion in accordance with the invention.
Figure 5:
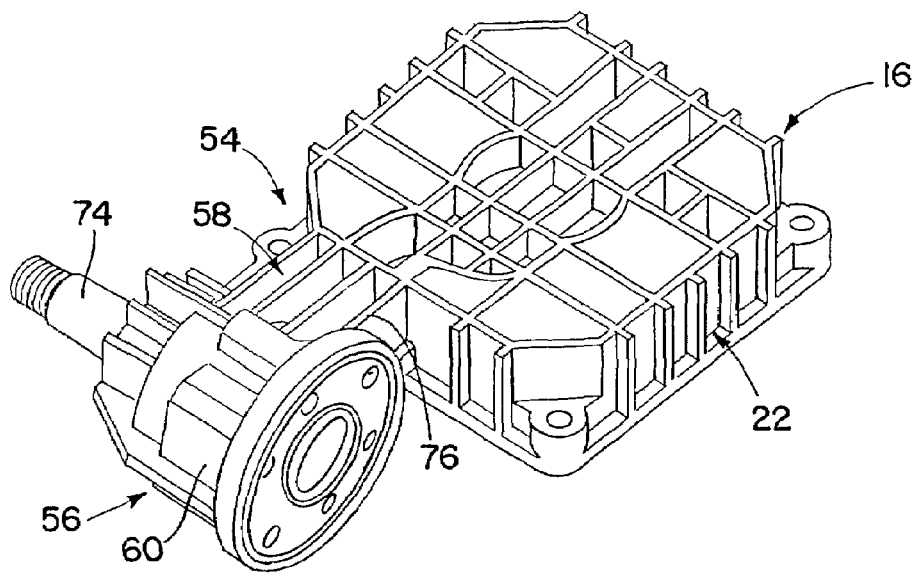
FIG. 5 is another perspective view of the structure of FIG. 4.

FIGS. 4 and 5 illustrate the lower housing portion 22 of the pump housing 16. The lower housing portion 22 includes a bypass valve 42 and make-up check valves 44 for the hydraulic pump 12. The purposes of the bypass valve 42 and the makeup check valves 44 are well known to those skilled in the art of hydrostatic transmissions. A reservoir 46 (FIG. 4), which in the illustrated embodiment is a sump, is also formed by the lower housing portion 22 of the pump housing 16. A portion of the lower housing portion 22 is a pump end cap 48 to which the open end of the pump assembly 15 is mounted. As illustrated in FIG. 4, the end cap 48 also includes ports 50 for supplying hydraulic fluid to and from the hydraulic pump 12.

Figure 25:
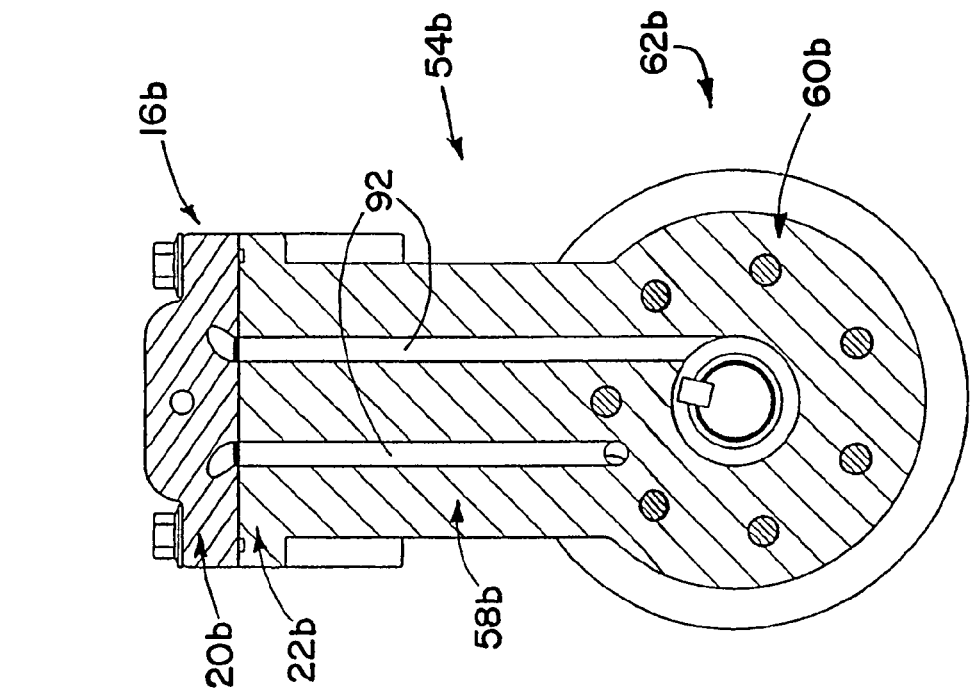
FIG. 25 is a cross-sectional view taken along the line B-B in FIG. 20.
Figure 24:
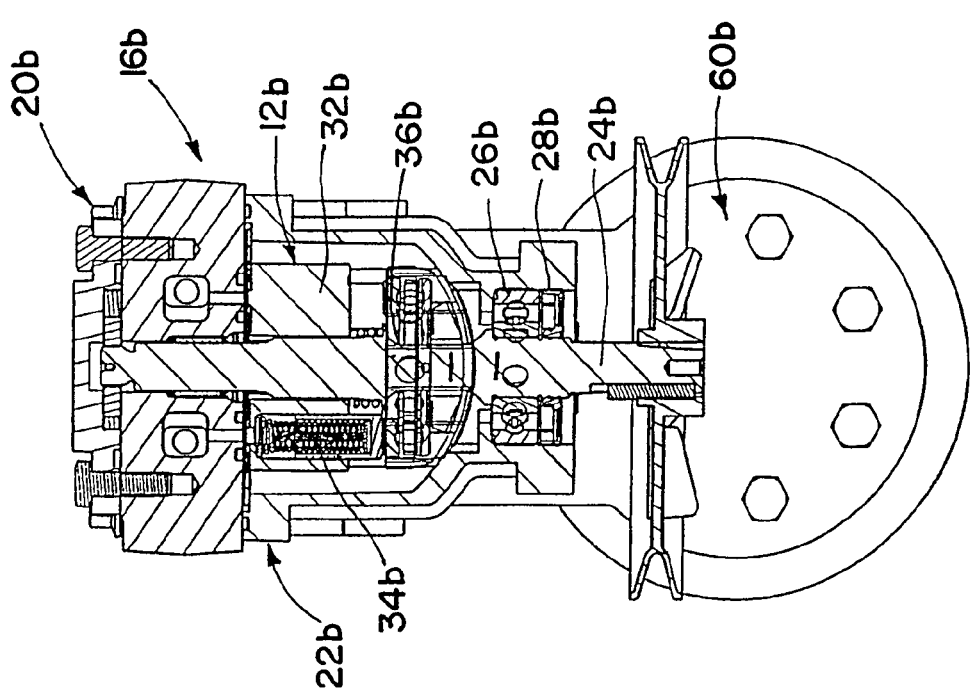
FIG. 24 is a cross-sectional view taken along the line A-A in FIG. 20.
Figure 26:
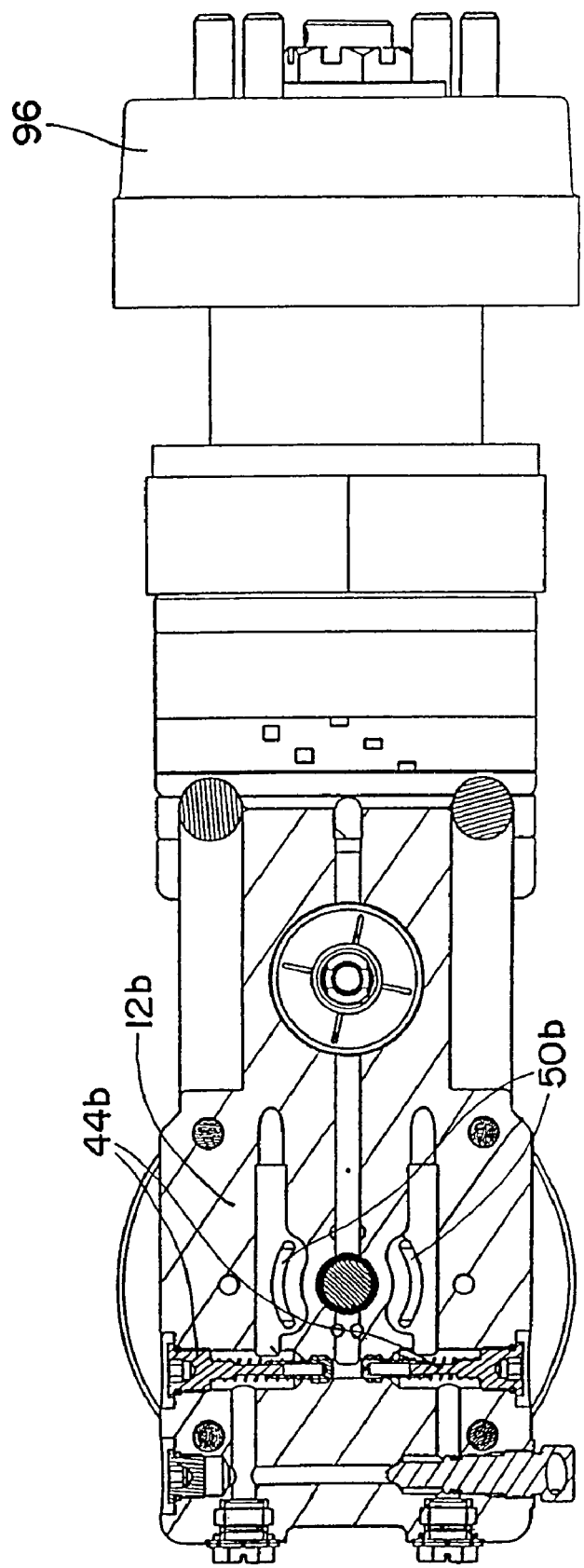
FIG. 26 is a cross-sectional view taken along the line C-C in FIG. 20.
Figure 27:
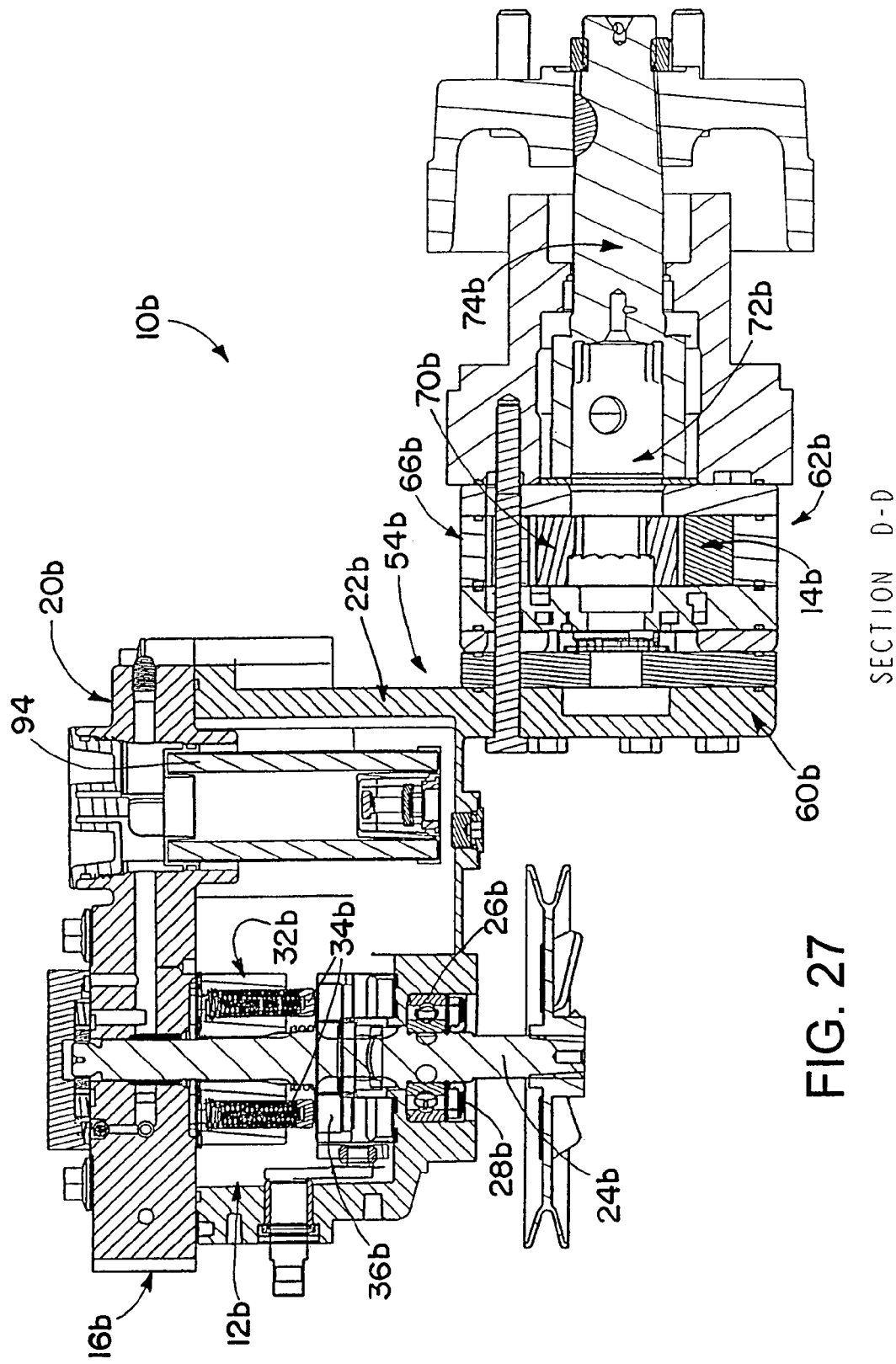
FIG. 27 is a cross-sectional view taken along the line D-D in FIG. 23.

The lower housing portion 22 of the pump housing 16 is part of an integral, monolithic structure 54 that also includes a bridge (interconnecting) portion 58, also referred to as an external manifold, and a base portion 60 of the motor housing 62. Preferably, the structure 54 is cast from metal, however, the structure 54 can be made by any suitable process and of any suitable material. The structure 54 includes two conduits (flow passages) that connect the pump ports 50 to ports in the base portion 60 of the motor housing 62 for supplying hydraulic fluid between the pump 12 and motor 14. The conduits are formed during the casting process and extend through the bridge portion 58 of the structure 54. The conduits will be described in more detail in connection with FIG. 25.

Figure 6:
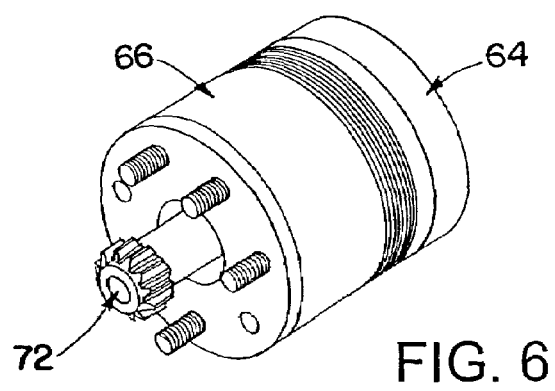
FIG. 6 is a perspective view of a motor assembly and motor housing.
Figure 7:
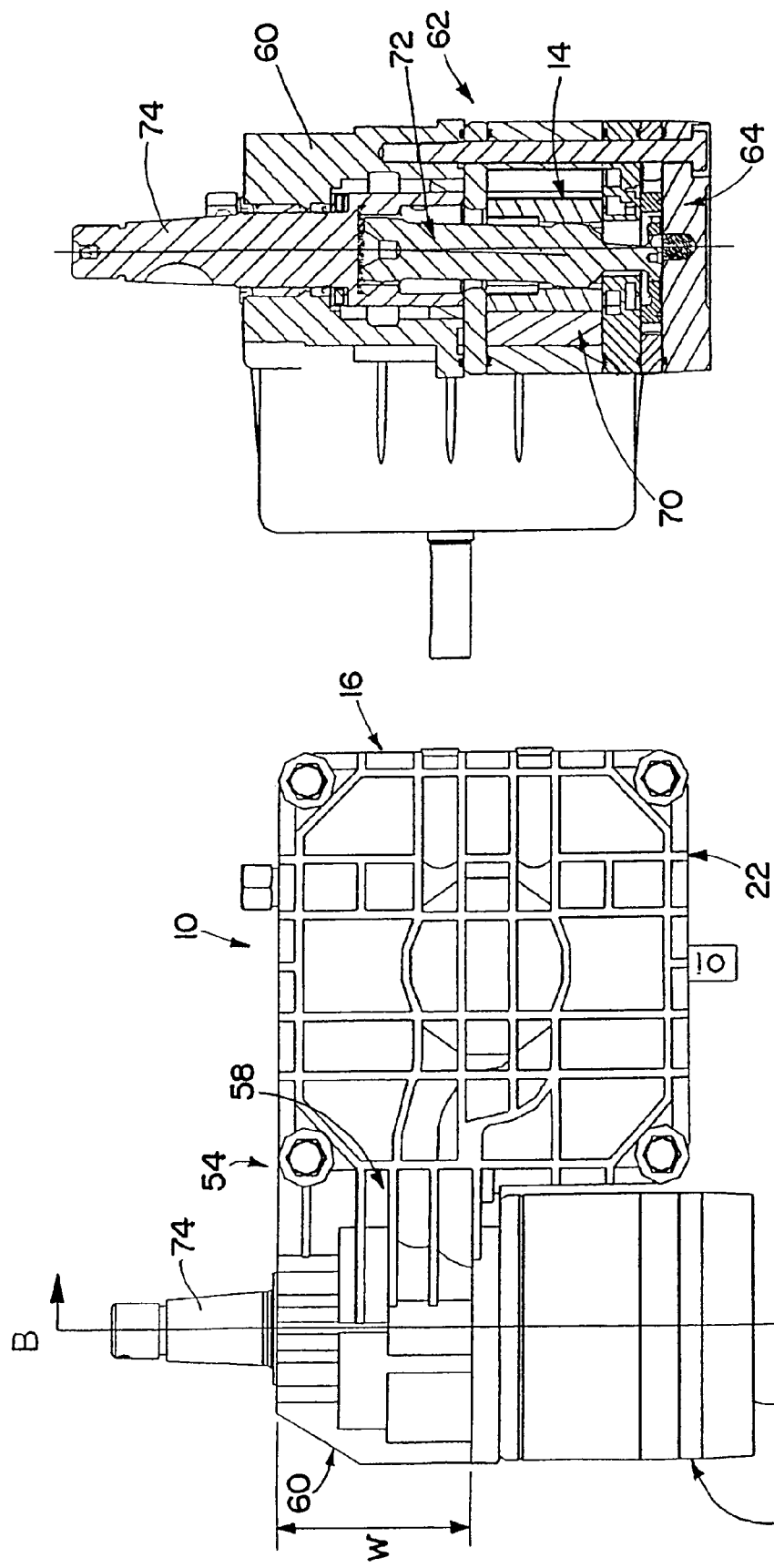
FIG. 7A is a bottom view of the hydrostatic transmission of FIG. 1.
FIG. 7B is a cross-sectional view of the hydrostatic transmission taken along line B-B of FIG. 7A.
Figure 8:
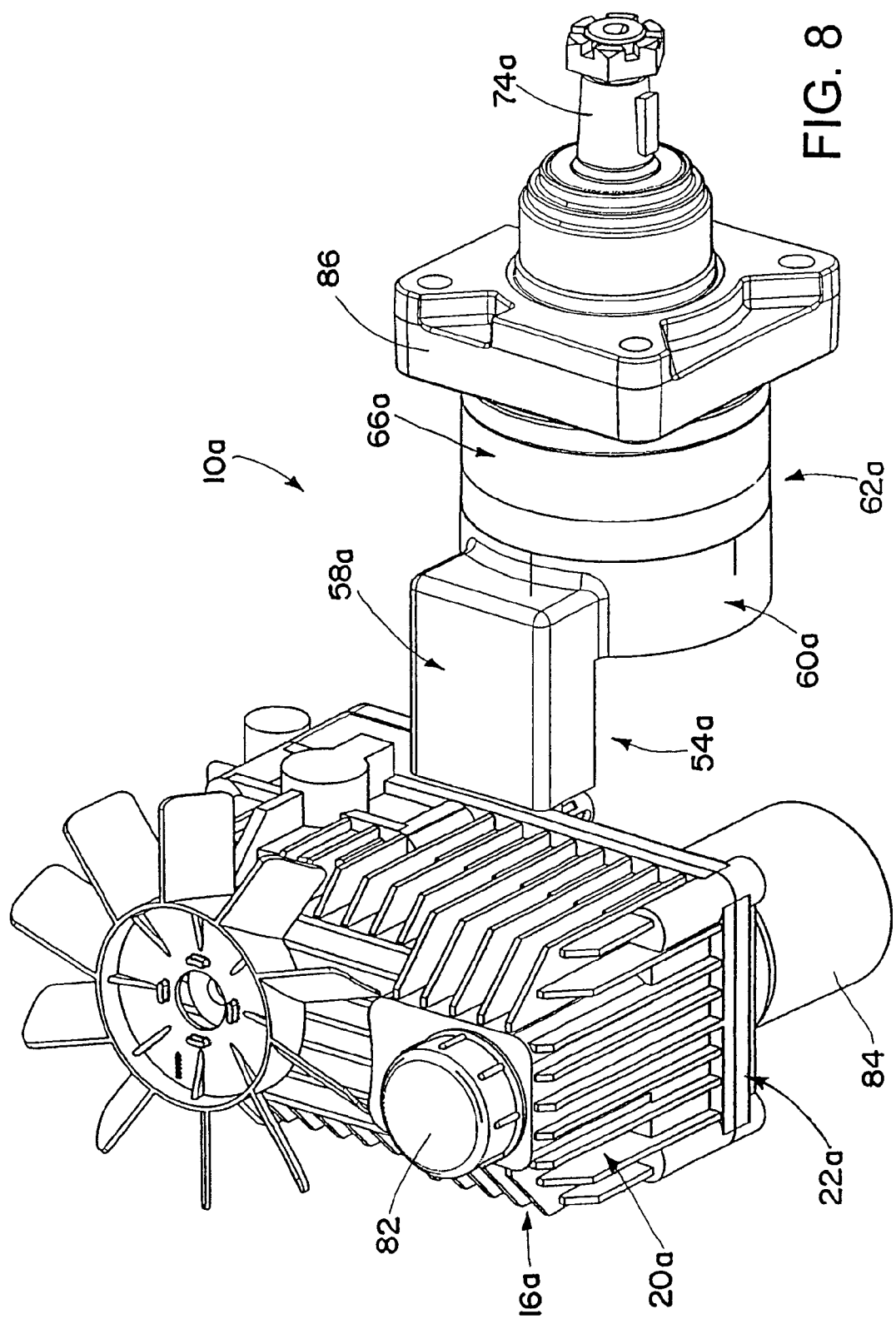
FIG. 8 is a perspective view of another exemplary hydrostatic transmission in accordance with the invention.

Turning to FIGS. 6, 7A, and 7B, the motor 14 includes a motor assembly 70 (FIGS. 7A and 7B) and the motor housing 62. The motor housing 62 is formed by an end cap 64, a rear housing portion 66, and base portion 60 of structure 54. Base portion 60 is generally cylindrical and configured for the motor assembly 70 to be mounted thereto. The motor assembly 70 can be removably attached to the base portion 60, and therefore replacement of the motor assembly 70 with another motor assembly of a different displacement or for repair or replacement is possible. It will be appreciated that the invention is not limited to gerotor motors and that other types of motors can be used in accordance with the invention. A drive link 72 extending from the hydraulic motor assembly 70 is connected to an output shaft 74 that is supported for rotation within the base portion 60.

Operation of the hydrostatic transmission 10 is generally known and will not be described in detail herein. It will be appreciated that during operation, hydraulic fluid is pressurized by the pump 12 and passes between the pump 12 and motor 14 via the conduits formed in the structure 54. Particularly, fluid from the pump 12 is supplied to the motor 14 and fluid from the motor 14 is returned to the pump 12 and/or sump 46 through the conduits in the bridge portion 58 of the structure 54. Since the conduits are formed in the structure 54, there are no hose connections or the like for connecting to the pump housing 16 and the motor housing 62. As a result, a tendency for the leakage to occur with the hydrostatic transmission 10 of the present invention is dramatically decreased.

As best seen in FIG. 5, the bridge portion 58 is surrounded by and in contact with air. Accordingly, as the hydraulic fluid flows through the bridge 58 via the conduits, heat from the fluid can be transferred to the air. One or more cooling fins 76 are provided on the bridge portion 58 for increasing heat transfer from the hydraulic fluid to the air.

The bridge portion 58 has a width W (see FIG. 7A) in a direction transverse to the longitudinal direction of the flow passageway therein that is narrower than the corresponding width of at least one of the pump housing 16 or motor housing 62. The bridge portion 58 also has a generally planar extent that is perpendicular to a longitudinal axis of the pump 12 and parallel to a longitudinal axis of the motor 14.

It will be appreciated that the bridge portion 58 not only provides cooling of the hydraulic fluid passing therethrough, but also simplifies the design of the hydrostatic transmission 10 by making it easier to achieve a desired relative orientation of a pump input shaft 24 and a motor output shaft 74 without having to redesign the pump housing 16 or motor housing 62. By way of example, it will be appreciated that if a relative orientation of the pump shaft 24 and motor shaft 74 other than the orientation shown in FIG. 1 is desired, such orientation can be achieved simply by reshaping the bridge portion 58.

Turning to FIGS. 8-15, another exemplary hydrostatic transmission 10a in accordance with another aspect of the present invention will be described. Features illustrated in FIGS. 8-15 that are similar to those illustrated in FIGS. 1-7C are identified with the same reference number with the addition of the suffix "a".

The hydrostatic transmission 10a of FIGS. 8-15 is similar to the hydrostatic transmission of FIGS. 1-7C except for the monolithic, one-piece structure 54a. In this embodiment, the structure 54a includes a base portion 22a of the pump housing 16a, part of which is an end cap of the pump housing 16a. The motor housing portion 60a of the monolithic structure 54a is an end cap 60a of the motor housing 62a. Like the embodiment described with reference to FIGS. 1-7, two conduits extend through the bridge portion 58a of the structure 54a for providing fluid communication between the hydraulic pump 12a and the hydraulic motor 14a. Unlike the embodiment of FIGS. 1-7, however, both the pump housing portion 22a and the motor housing portion 60a are end caps.

The bridge portion 58a is surround by and in contact with air. Accordingly, the bridge portion 58a can dissipate heat when hydraulic fluid is flowing therethrough. Although not shown, one or more cooling fins can be provided on the bridge portion 58a to further enhance the cooling effect.

Figure 9:
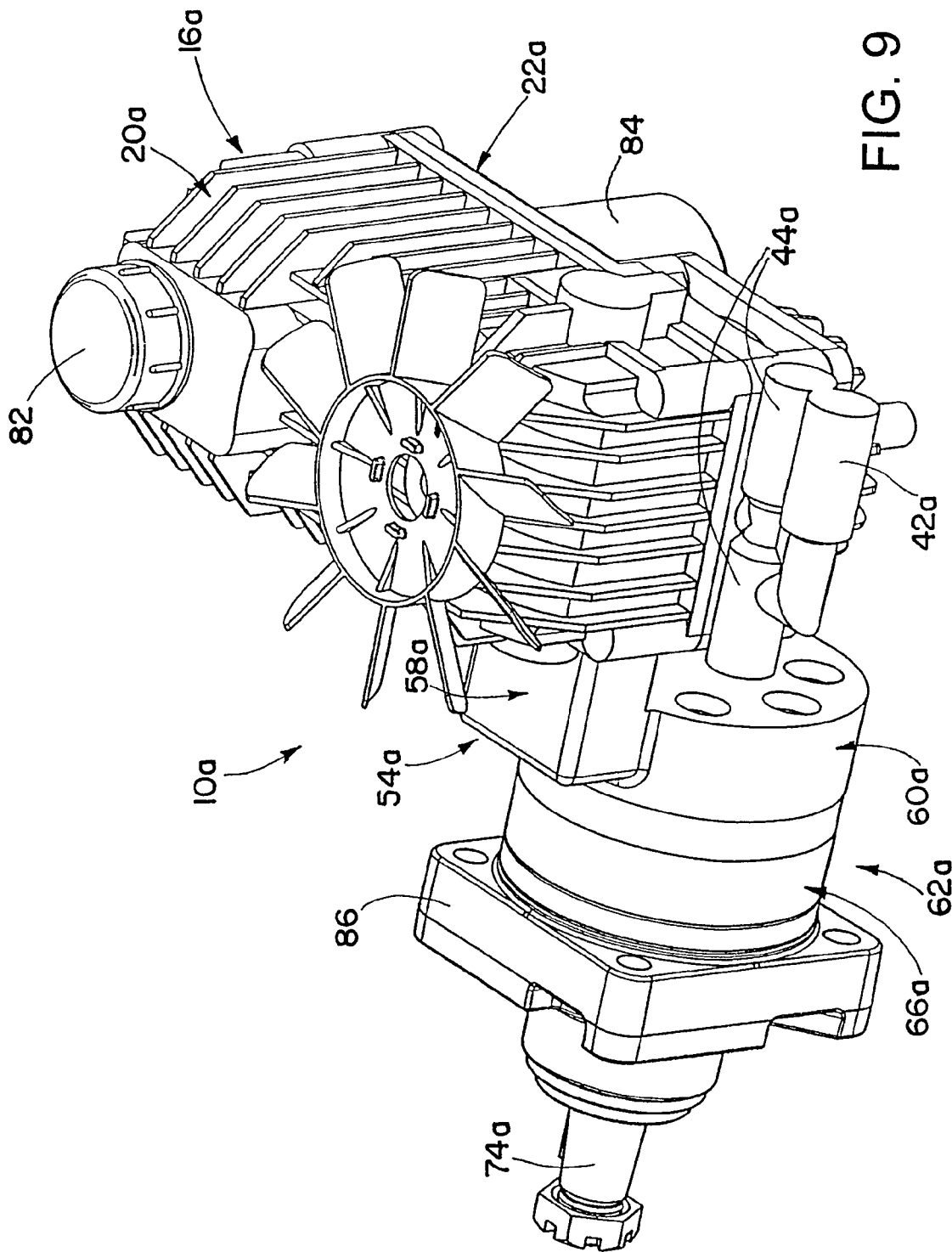
FIG. 9 is another perspective view of the hydrostatic transmission of FIG. 8.
Figure 10:
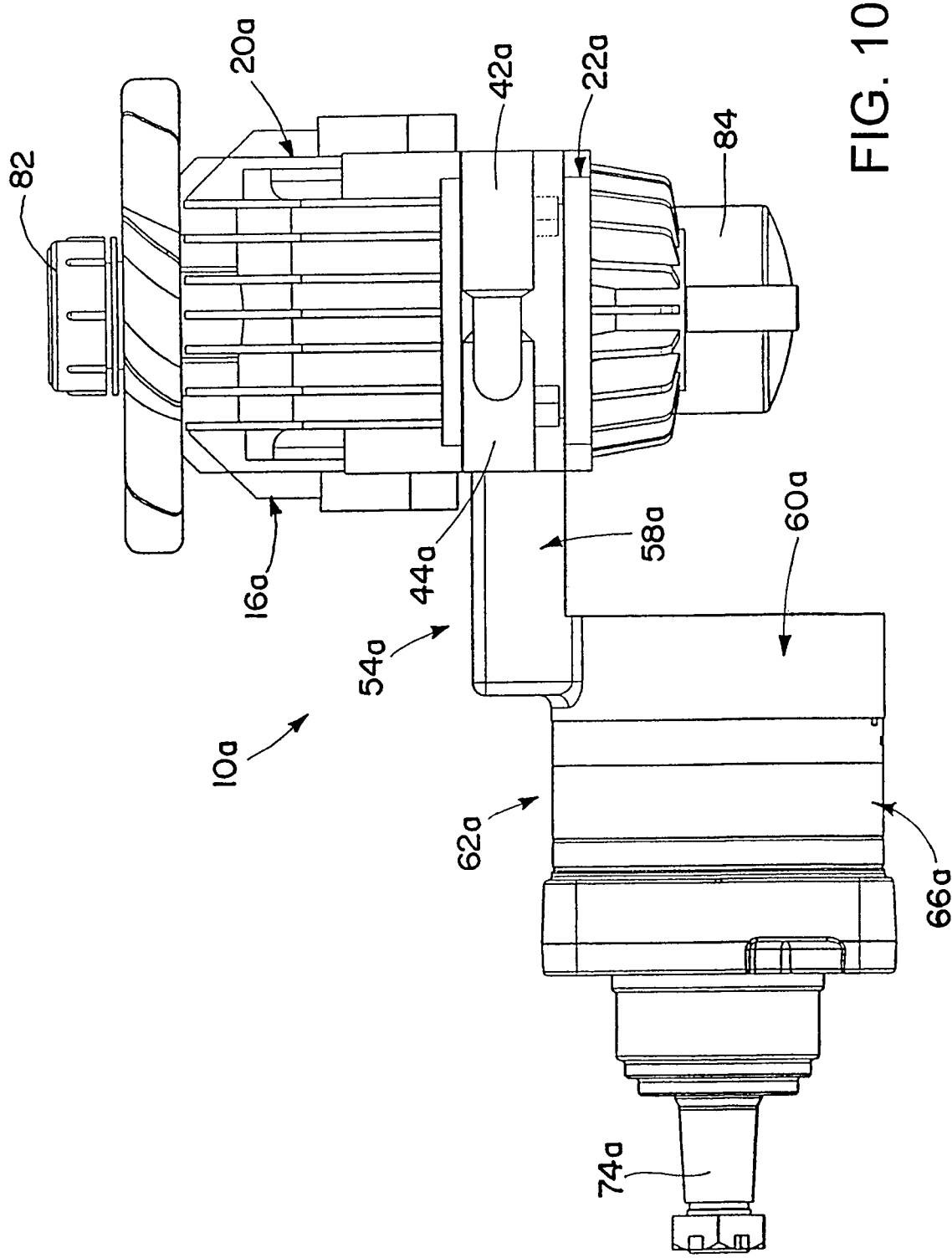
FIG. 10 is a side view of the hydrostatic transmission of FIG. 8.
Figure 11:
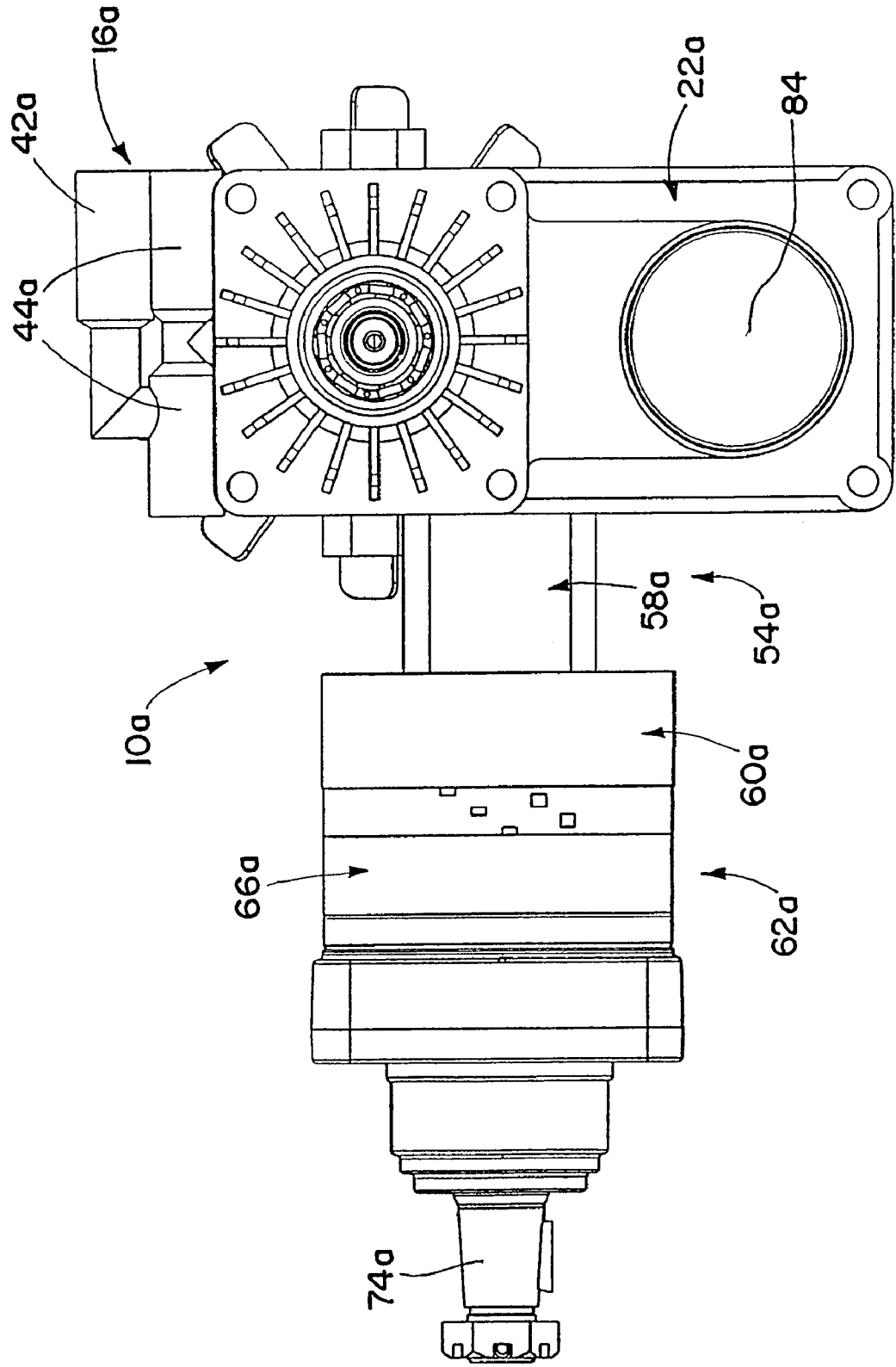
FIG. 11 is a top view of the hydrostatic transmission of FIG. 8.
Figure 12:
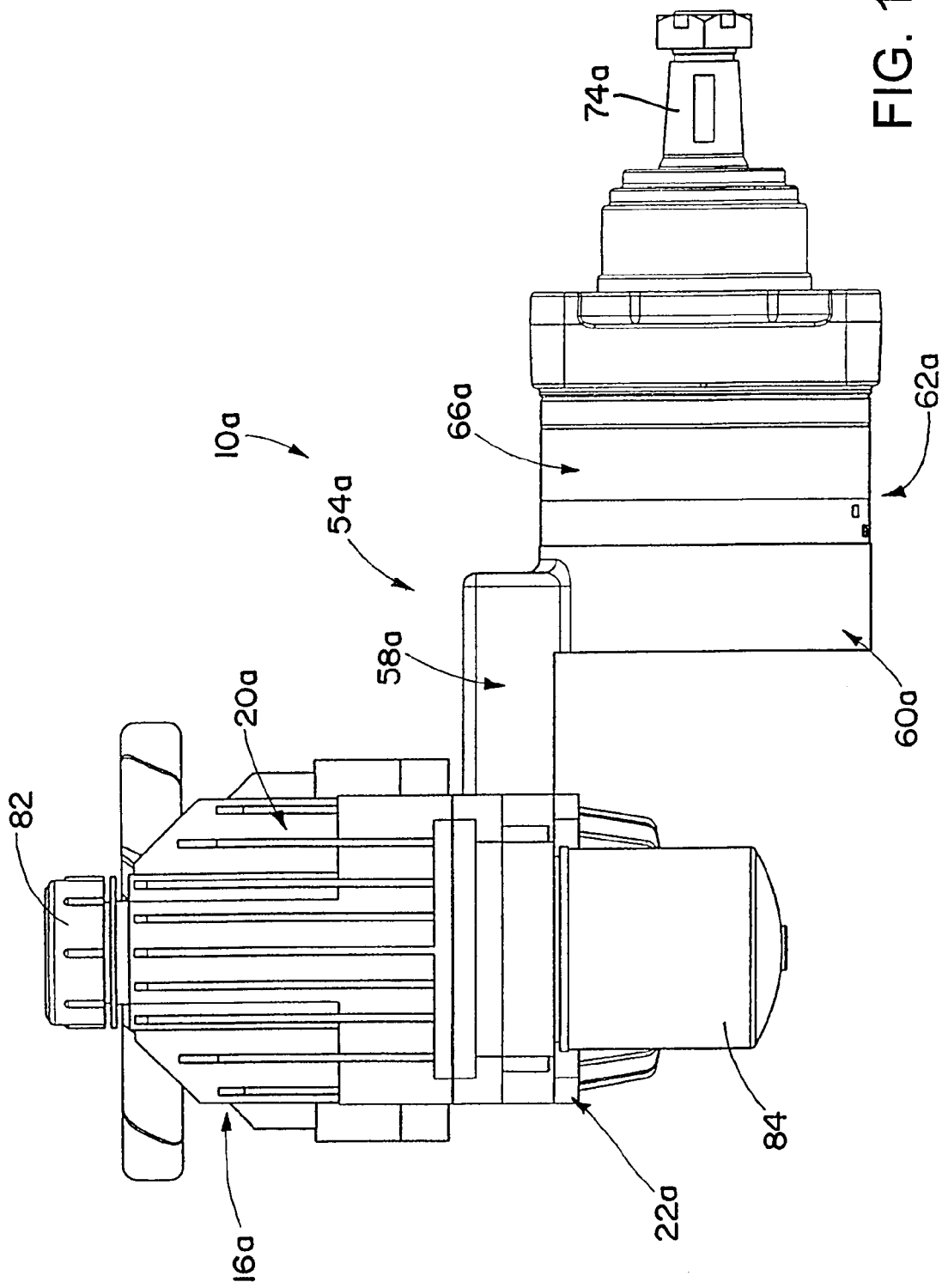
FIG. 12 is another side view of the hydrostatic transmission of FIG. 8.
Figure 13:
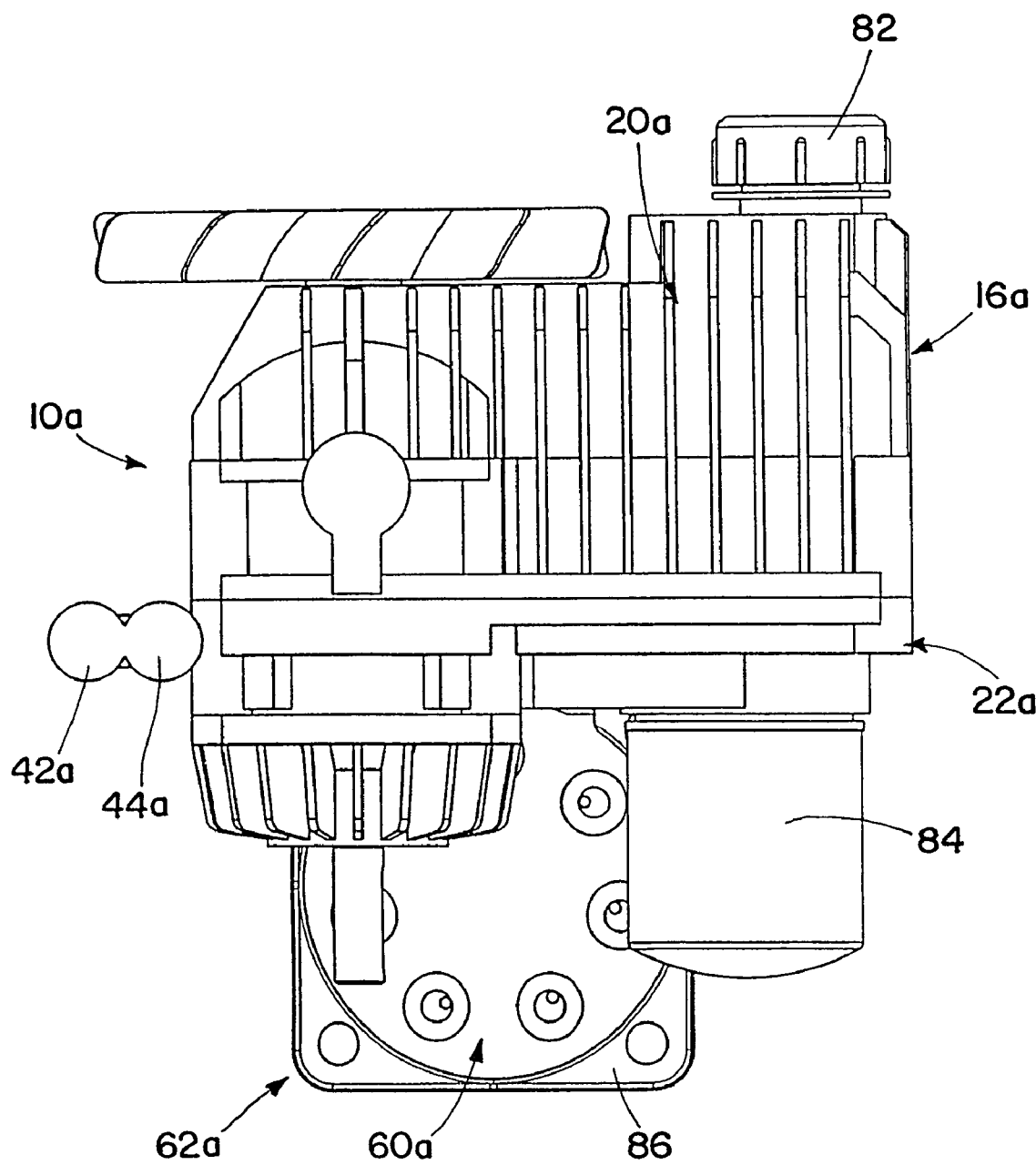
FIG. 13 is another side view of the hydrostatic transmission of FIG. 8.
Figure 14:
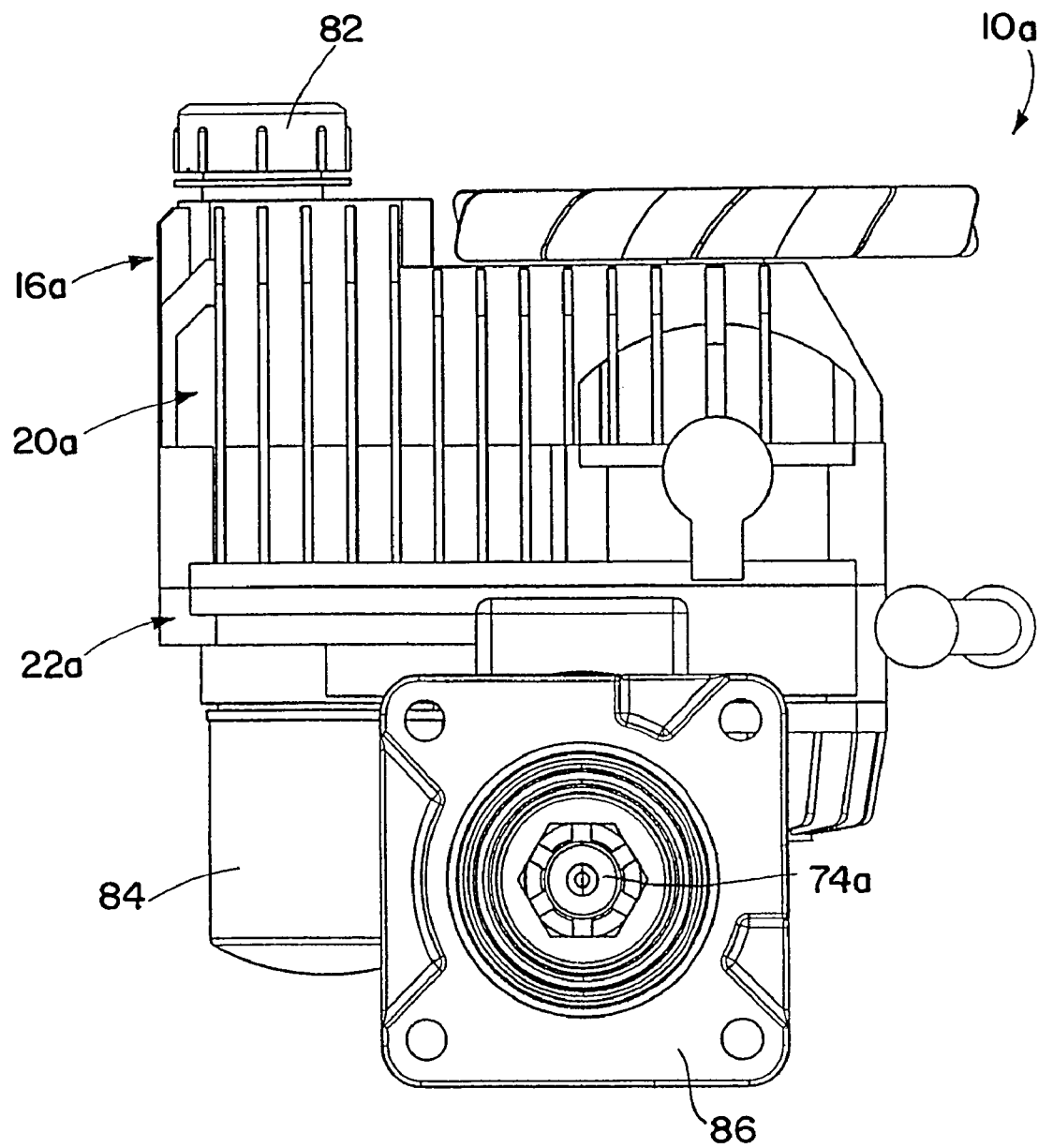
FIG. 14 is another side view of the hydrostatic transmission of FIG. 8.
Figure 15:
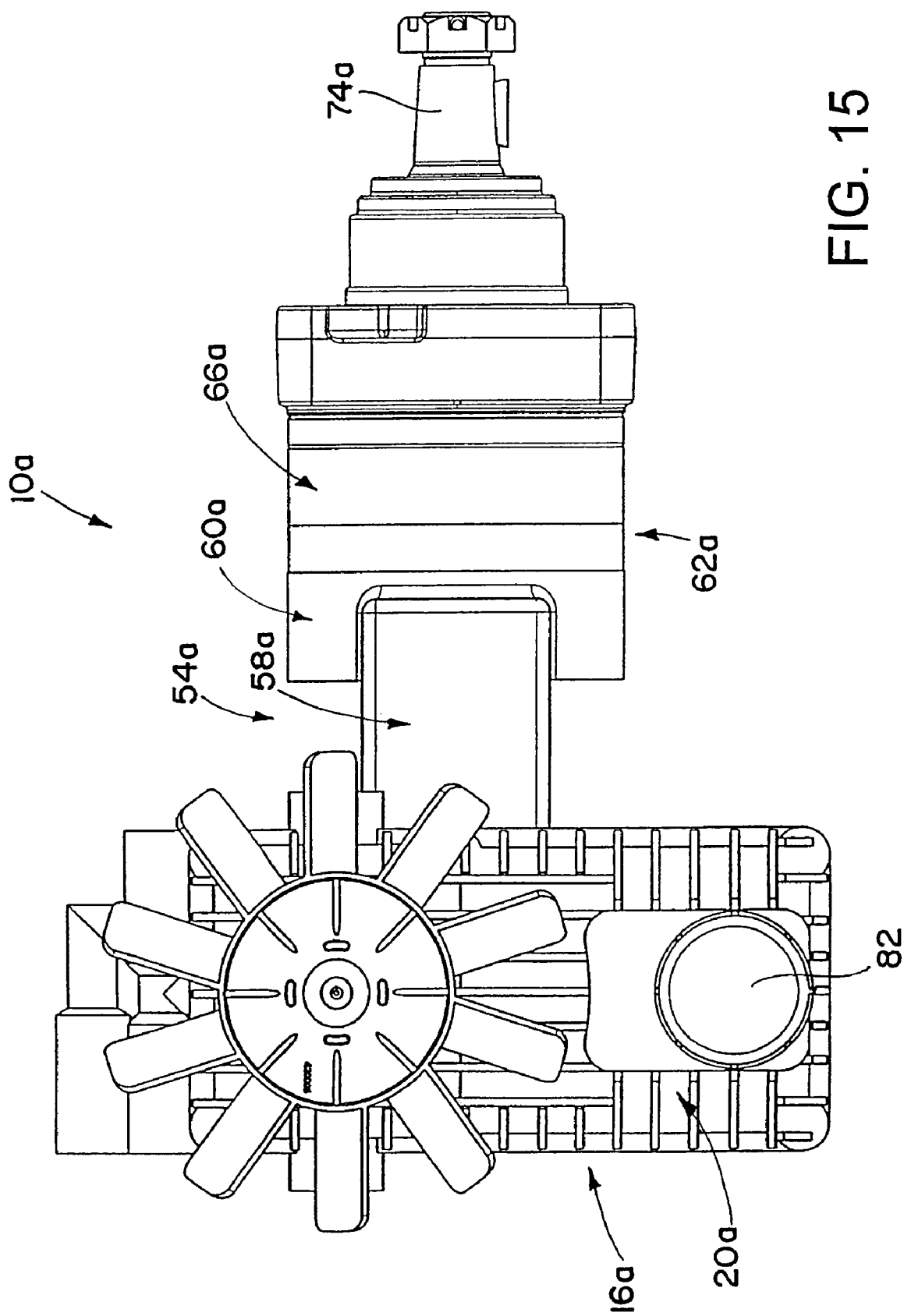
FIG. 15 is a top view of the hydrostatic transmission of FIG. 8.

FIGS. 8-15 also illustrate a breather 82 and a filter 84 of the hydraulic circuit. The illustrated filter 84 is an external filter that attaches to the base portion 22a of the pump housing 16a. FIG. 9 illustrates the bypass valve 42a and the make-up check valves 44a located external to the pump housing 16a.

The embodiment of FIGS. 8-15 also has a generally L-shape or T-shape configuration with a longitudinal extent of the pump housing 16a extending generally perpendicular to a longitudinal extent of the motor housing 62a. A mounting flange 86 for mounting the hydrostatic transmission 10a to a vehicle is also shown. The generally T-shape configuration facilitates the use of the hydrostatic transmission 10b on either side of a vehicle.

Turning to FIGS. 16-27 an exemplary hydrostatic transmission 10b constructed in accordance with another aspect of the present invention will be described. Features illustrated in FIGS. 16-27 that are similar to those illustrated in FIGS. 1-7C are identified with the same reference number with the addition of the suffix "b".

The hydrostatic transmission 10b of FIGS. 16-27 also includes a monolithic, one-piece structure 54b that includes a base portion 22b of the pump housing 16b, a base portion 60b of the motor housing 62b, and a bridge portion 58b for connecting the pump housing portion and the motor housing portion. In the embodiment of FIGS. 16-27, the pump housing base portion 22b is a lower portion of the pump housing 16b. The pump housing base portion 22b of the pump housing 16b includes a cavity for the hydraulic pump 12b and a reservoir (sump). An upper housing portion 20b is attachable to the lower portion 22b of the pump housing 16b for closing the pump housing 16b. The motor housing portion 60b of the structure 54b is an end cover of the motor housing 62b. Like the embodiment described with reference to FIGS. 1-7C, two conduits 92 (FIG. 25), for example, extend through the bridge portion 58 for connecting the pump 12b and motor 14b.

Figure 16:
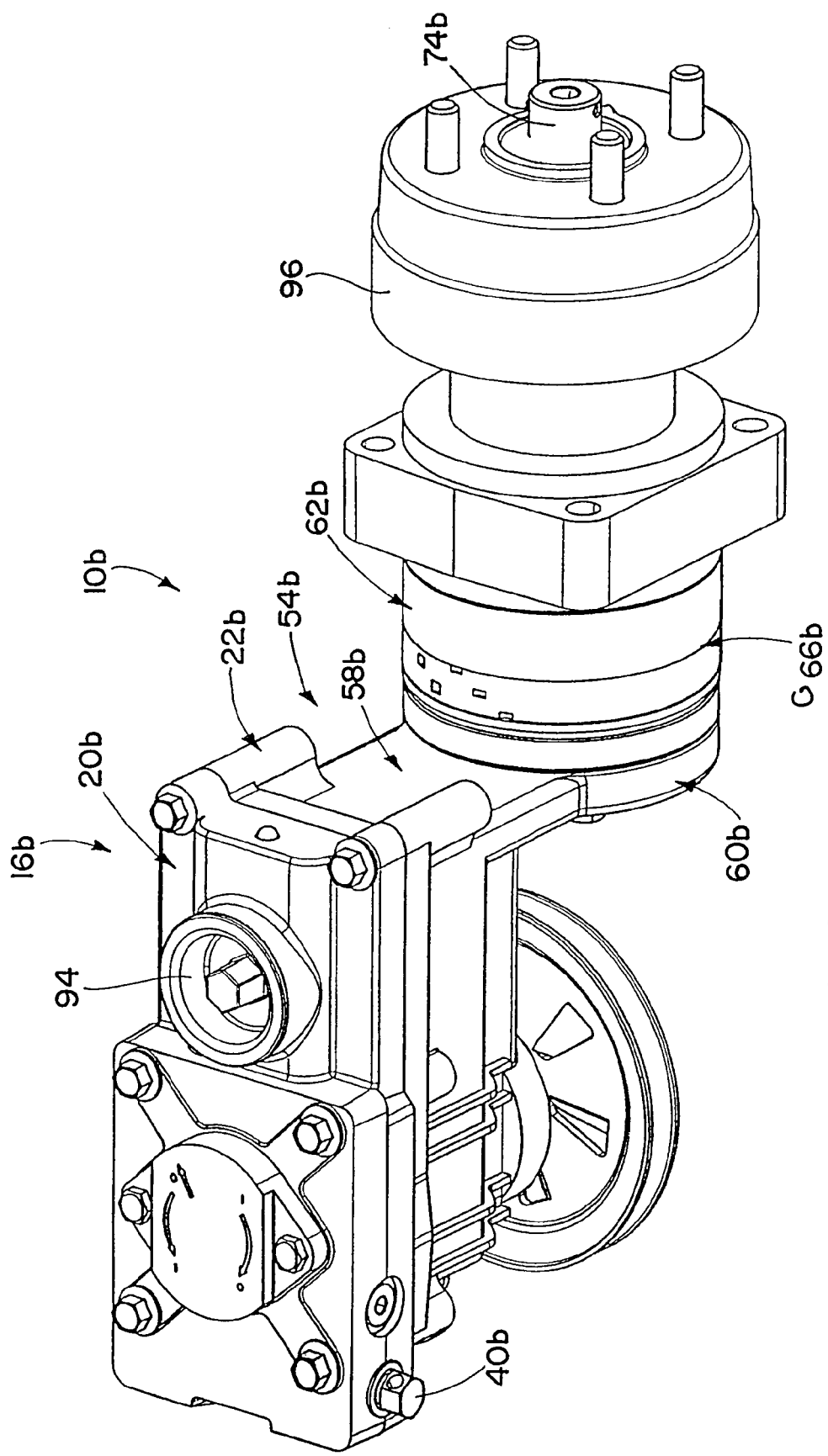
FIG. 16 is a perspective view of another exemplary hydrostatic transmission in accordance with the invention.
Figure 17:
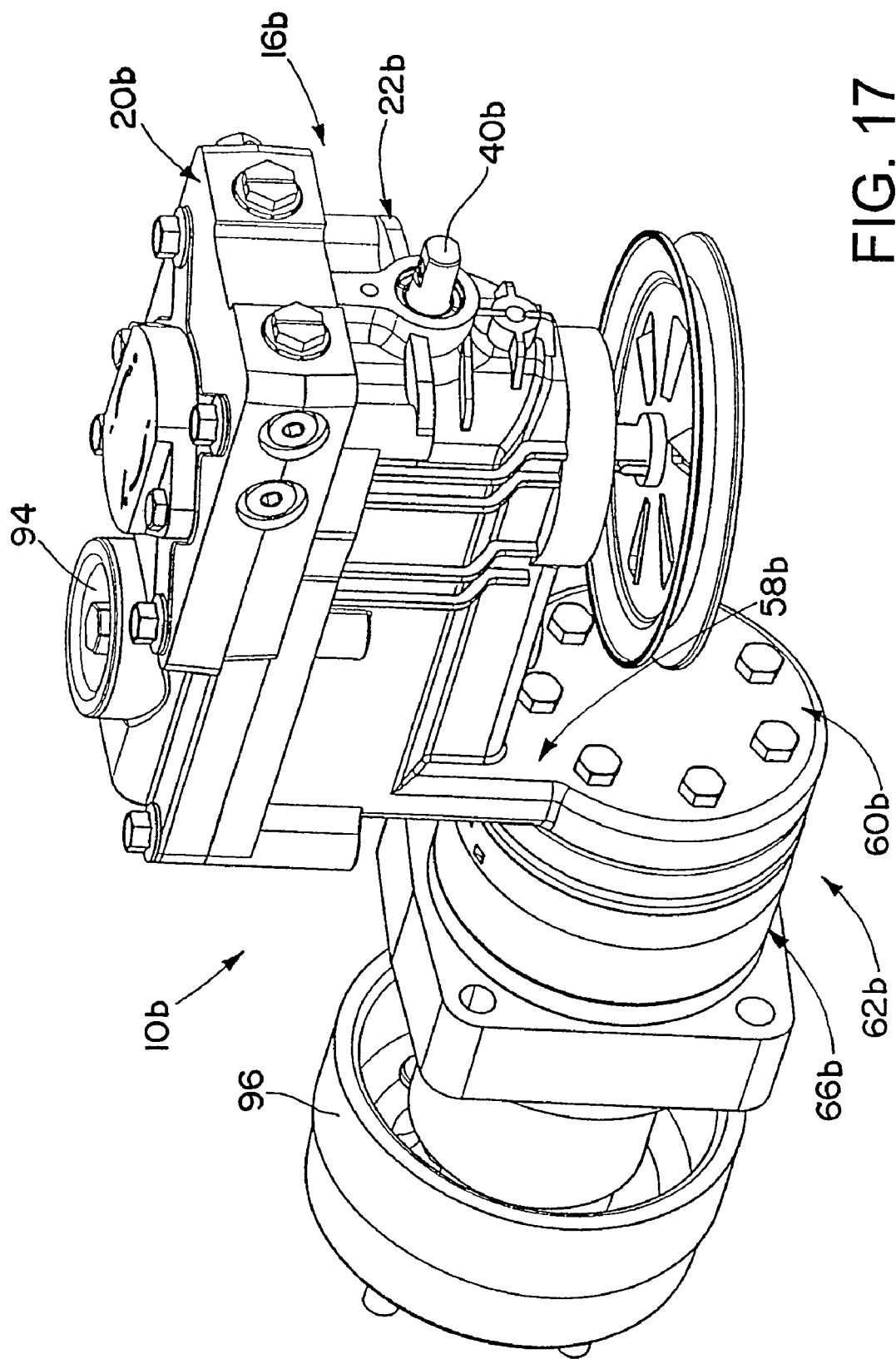
FIG. 17 is another perspective view of the hydrostatic transmission of FIG. 16.
Figure 18:
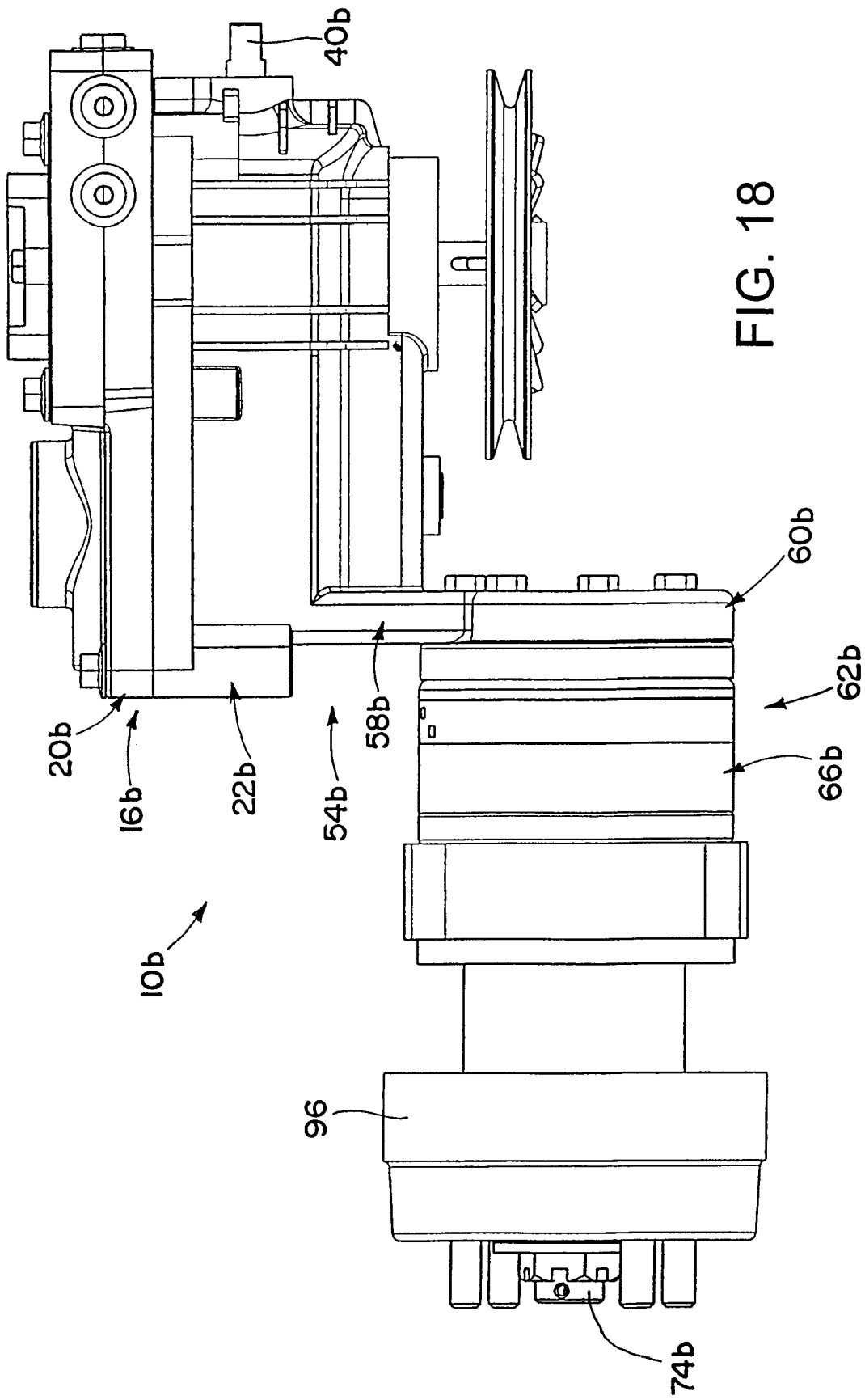
FIG. 18 is a side view of the hydrostatic transmission of FIG. 16.
Figure 19:
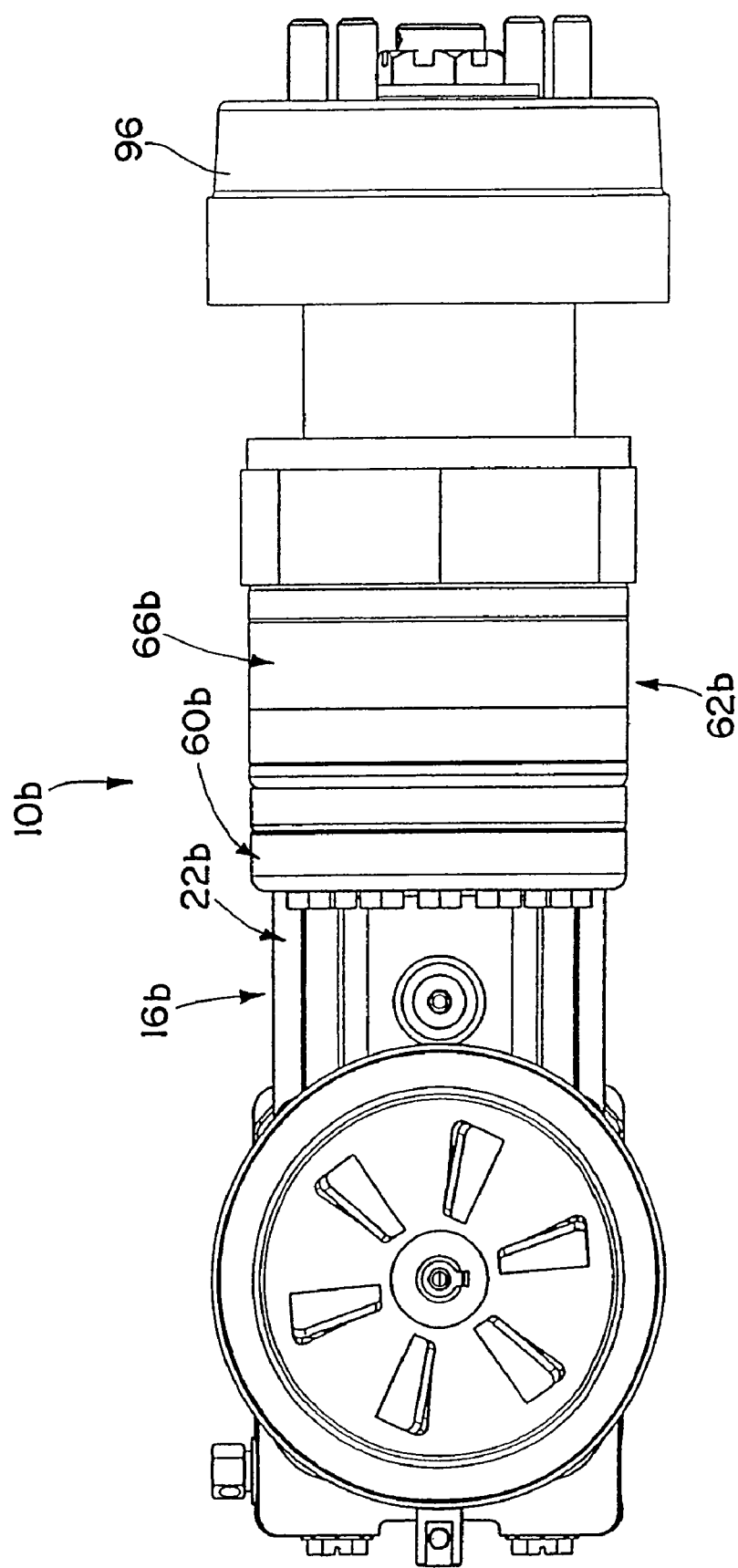
FIG. 19 is a bottom view of the hydrostatic transmission of FIG. 16.
Figure 20:
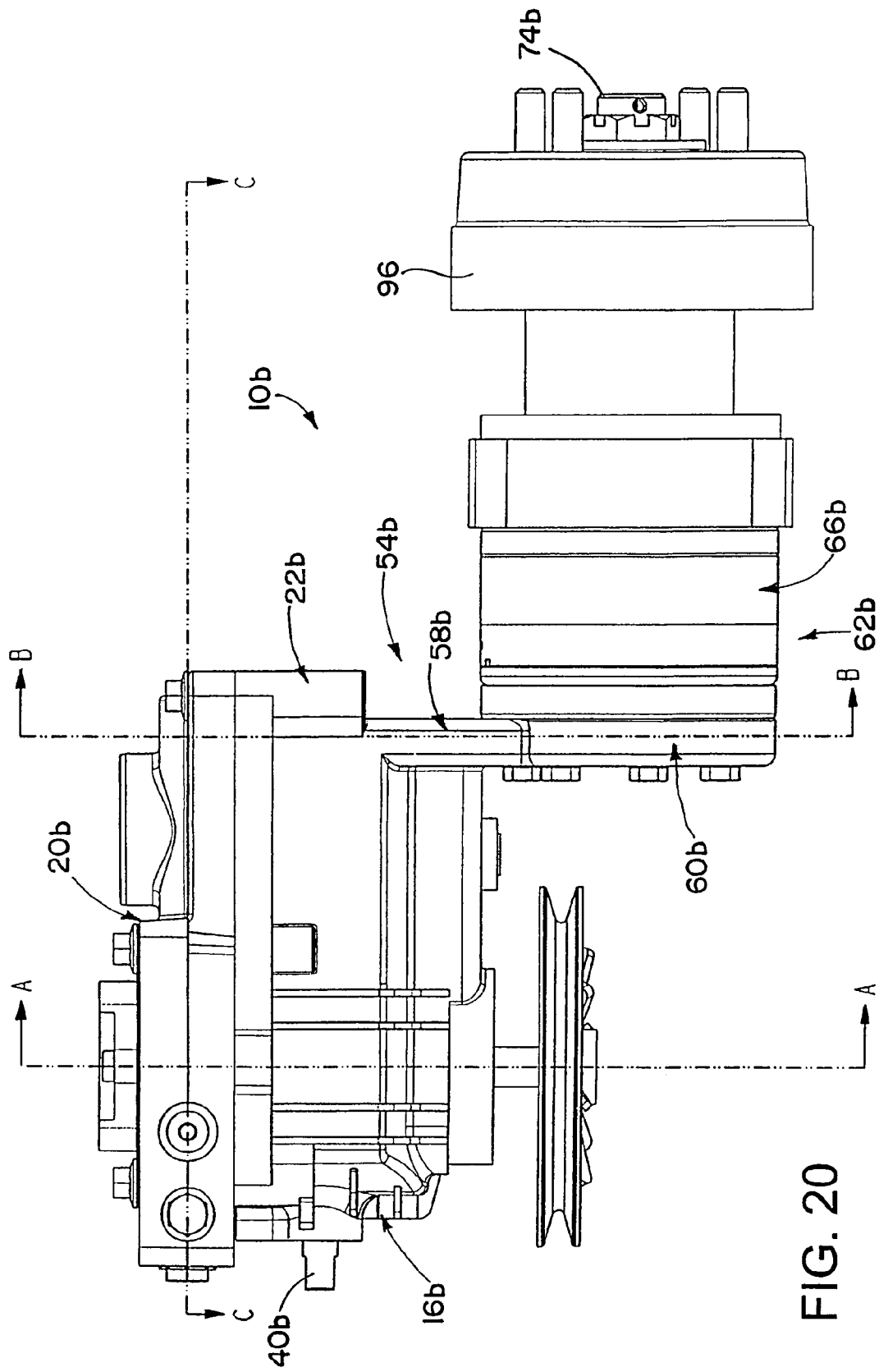
FIG. 20 is another side view of the hydrostatic transmission of FIG. 16.
Figure 22:
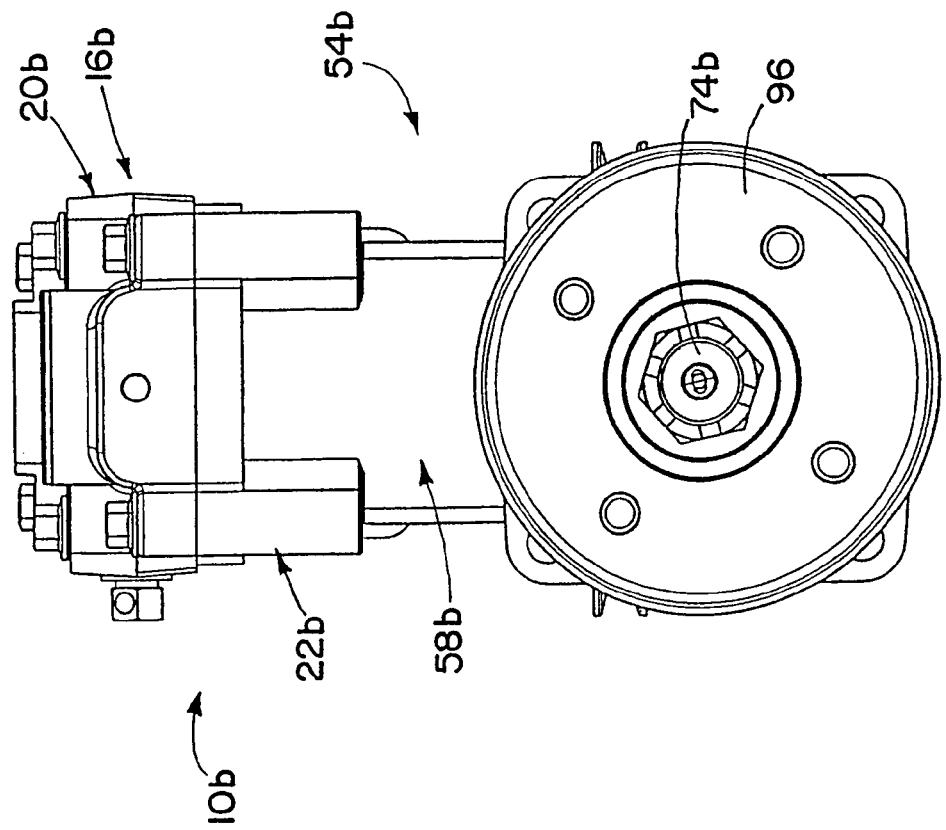
FIG. 22 is another end view of the hydrostatic transmission of FIG. 16.
Figure 21:
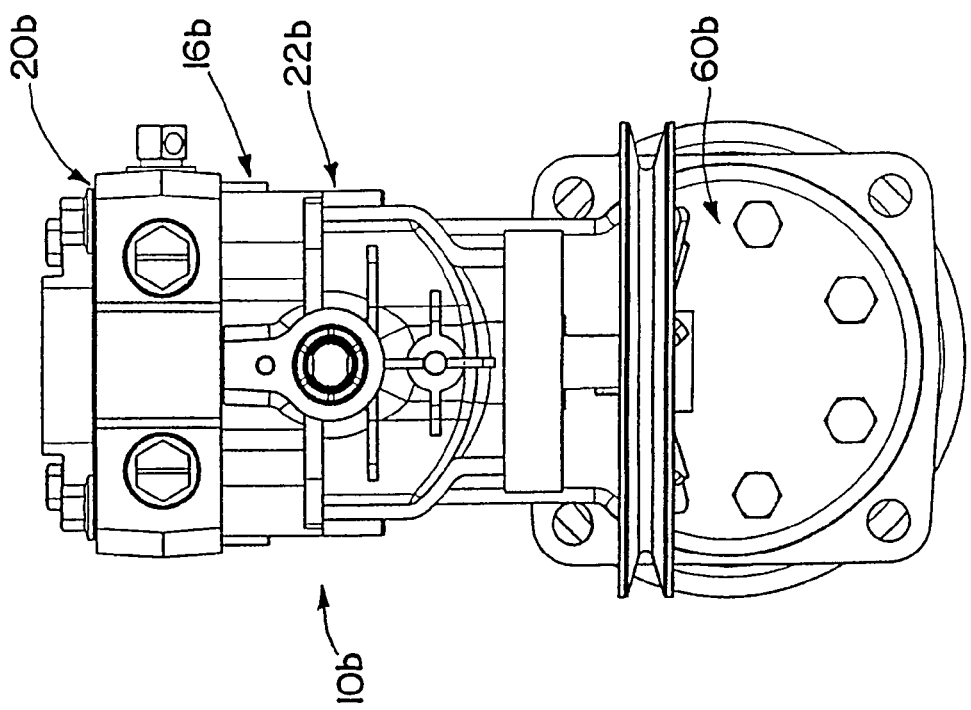
FIG. 21 is an end view of the hydrostatic transmission of FIG. 16.
Figure 23:
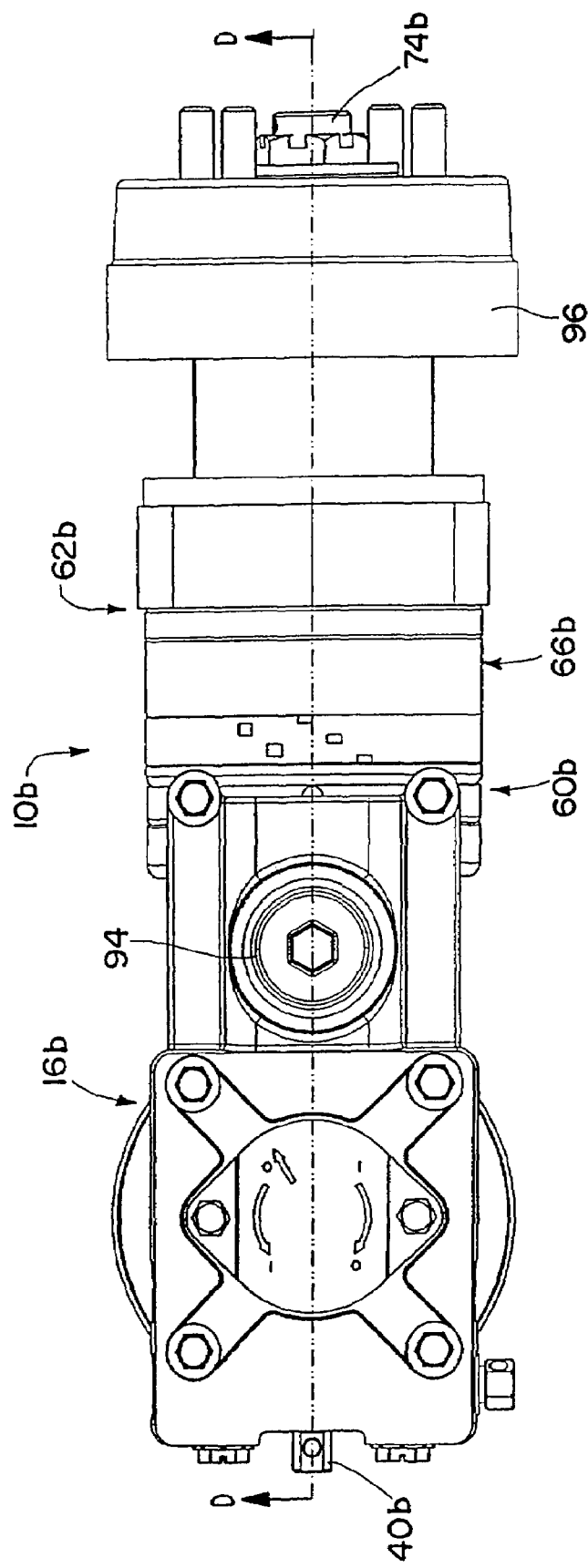
FIG. 23 is a top view of the hydrostatic transmission of FIG. 16.

FIGS. 16, 17, and 23 illustrate a filter 94 of the hydraulic circuit of the hydrostatic transmission 10b. The illustrated filter 94 is an internal filter that attaches to the upper end cover 20b of the pump housing 16b. The embodiment of FIGS. 16-27 has a generally Z-shaped configuration with a longitudinal extent of the pump housing 16b extending generally parallel to a longitudinal extent of the motor housing 62b. In the embodiment of FIGS. 16-27, a drum brake 96 is attached to the output shaft 74b of the hydraulic motor 14b.

It will now be appreciated that the invention provides an external manifold that dissipates heat and increases the flexibility of the hydrostatic transmission by making it possible to achieve a desired orientation of the pump and motor with modification only to the shape of the external manifold portion.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydrostatic transmission comprising:
a hydraulic pump including a pump assembly and a pump housing;
a hydraulic motor including a motor assembly and a motor housing spaced away from the pump housing;
a structure for providing fluid communication between the hydraulic pump and the hydraulic motor, the structure including at least a base portion of the pump housing, at least a base portion of the motor housing, and an interconnecting portion for connecting the pump housing portion and the motor housing portion; and
a reservoir for storing hydraulic fluid for delivery to at least one of the pump and motor, the structure for providing fluid communication and the reservoir being part of a monolithic structure.

2. A hydrostatic transmission as set forth in claim 1, wherein the pump assembly is removably attached to at least the base portion of the pump housing.

3. A hydrostatic transmission as set forth in claim 1, wherein the motor assembly is removably attached to at least the base portion of the motor housing.

4. A hydrostatic transmission as set forth in claim 1, wherein the interconnecting portion has at least one flow passage for connecting the pump and motor, and the interconnecting portion being surrounded by and in contact with air for cooling of fluid passing through the at least one flow passage in the interconnecting portion.

5. A hydrostatic transmission as set forth in claim 1, wherein the interconnecting portion has a width in a direction transverse to the longitudinal direction of the flow passageway therein that is narrower than the corresponding width of at least one of the pump housing or motor housing.

6. A hydrostatic transmission as set forth in claim 1, wherein the structure for providing fluid communication between the hydraulic pump and the hydraulic motor has a generally planar extent that is parallel to a longitudinal axis of one of the pump or motor and perpendicular to the longitudinal axis of the other.

7. A hydrostatic transmission as set forth in claim 1, wherein the interconnecting portion includes at least one cooling fin.

8. A hydrostatic transmission as set forth in claim 1, wherein the base portion of the pump housing is an end cap.

9. A hydrostatic transmission as set forth in claim 1, wherein the base portion of the motor housing is an end cap.

10. A hydrostatic transmission as set forth in claim 1, wherein a longitudinal extent of the pump housing extends generally perpendicular to a longitudinal extent of the motor housing.

11. A hydrostatic transmission comprising:
a pump including a pump assembly and a pump housing;
a motor including a motor assembly and a motor housing;
an external manifold extending between and connecting the pump housing to the motor housing; and
a reservoir for storing hydraulic fluid for delivery to at least one of the pump and motor;
wherein the external manifold and the reservoir are part of a monolithic structure; and
wherein the external manifold includes at least one flow passage for connecting the pump and motor, the external manifold being surrounded by and in contact with air for cooling of fluid passing through the external manifold.

12. A hydrostatic transmission as set forth in claim 11, wherein the external manifold has a width in a direction transverse to the longitudinal direction of the flow passage therein that is narrower than the corresponding width of at least one of the pump housing or motor housing.

13. A hydrostatic transmission as set forth in claim 11, wherein the external manifold forms at least a base portion of the pump housing.

14. A hydrostatic transmission as set forth in claim 13, wherein the pump assembly is removably attached to at least the base portion of the pump housing.

15. A hydrostatic transmission as set forth in claim 13, wherein the base portion of the pump housing is an end cap.

16. A hydrostatic transmission as set forth in claim 11, wherein the external manifold forms at least a base portion of the motor housing.

17. A hydrostatic transmission as set forth in claim 16, wherein the motor assembly is removably attached to at least the base portion of the motor housing.

18. A hydrostatic transmission as set forth in claim 16, wherein the base portion of the motor housing is an end cap.

19. A hydrostatic transmission as set forth in claim 11, wherein the external manifold forms at least a base portion of the pump housing and at least a base portion of the motor housing.

20. A hydrostatic transmission as set forth in claim 19, wherein the pump assembly is removably attached to at least the base portion of the pump housing and the motor assembly is removably attached to at least the base portion of the motor housing.

21. A hydrostatic transmission as set forth in claim 11, wherein at least a portion of the external manifold has a generally planar extent that is parallel to a longitudinal axis of one of the pump or motor and perpendicular to the longitudinal axis of the other.

22. A hydrostatic transmission as set forth in claim 11, wherein the external manifold includes at least one cooling fin.

* * * * *